United States Patent [19]

Grover

[11] 4,430,616
[45] Feb. 7, 1984

[54] NUCLEAR MAGNETIC RESONANCE GYRO SCOPE

[75] Inventor: Bruce C. Grover, Thousand Oaks, Calif.

[73] Assignee: Litton Systems, Inc., Beverly Hills, Calif.

[21] Appl. No.: 344,249

[22] Filed: Jan. 29, 1982

Related U.S. Application Data

[63] Continuation-in-part of Ser. No. 162,337, Jun. 23, 1980, abandoned.

[51] Int. Cl.³ .......................................... G01R 33/08
[52] U.S. Cl. .................................... 324/304; 324/300
[58] Field of Search ............... 324/300, 302, 301, 304, 324/305

[56] References Cited

U.S. PATENT DOCUMENTS

| | | | |
|---|---|---|---|
| 4,005,355 | 1/1977 | Happer | 324/304 |
| 4,157,495 | 6/1979 | Grover | 324/302 |

*Primary Examiner*—Michael J. Tokar
*Attorney, Agent, or Firm*—Roy L. Brown

[57] ABSTRACT

A nuclear magnetic resonance gyro using two nuclear magnetic resonance gases, preferably xenon 129 and xenon 131, together with two alkaline metal vapors, preferably rubidium, potassium or cesium, one of the two alkaline metal vapors being pumped by light which has the wavelength of that alkaline metal vapor, and the other alkaline vapor being illuminated by light which has the wavelength of that other alkaline vapor.

6 Claims, 1 Drawing Figure

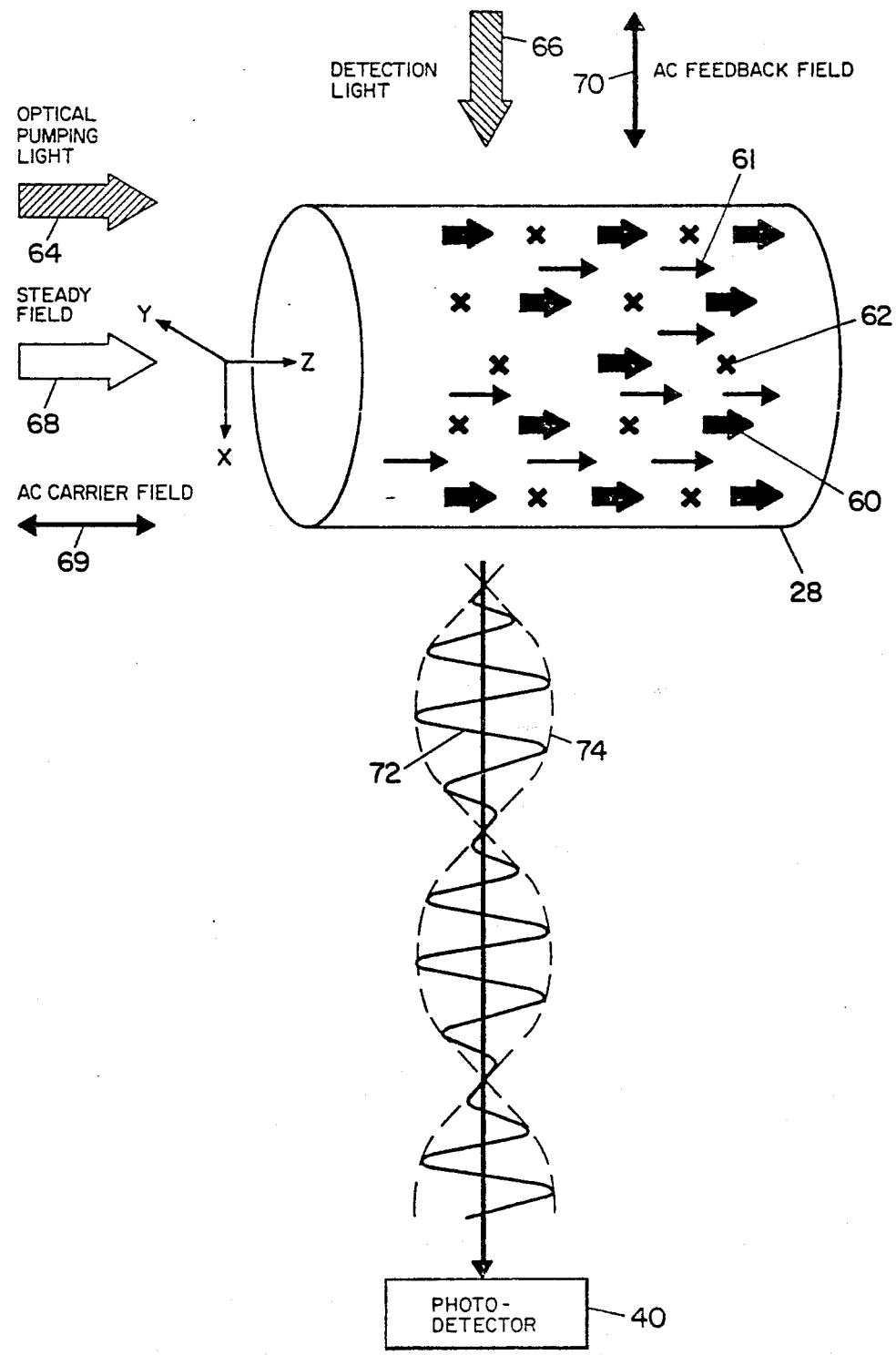

NUCLEAR MAGNETIC RESONANCE GYROSCOPE

CROSS-REFERENCE TO A RELATED PATENT APPLICATION

This is a Continuation in Part of abandoned patent application Ser. No. 162,337 which was filed by Bruce C. Grover on June 23, 1980, is assigned to Litton Systems Inc., and is entitled "Nuclear Magnetic Resonance Gyro." It is also an improvement of the invention in U.S. Pat. No. 4,157,495 which issued June 5, 1979 to Bruce C. Grover, Edward Kanegsberg, John G. Mark and Roger L. Meyer for a Nuclear Magnetic Resonance Gyro, which patent is assigned to Litton Systems, Inc., the assignee of this application.

BACKGROUND OF THE INVENTION

The invention relates to the creation and detection of nuclear magnetic resonance. More particularly the invention relates to the application of nuclear magnetic resonance in an angular rate sensor or gyroscope.

A number of approaches have been suggested in the prior art for creating a nuclear magnetic resonance gyroscope. In general, they use a nuclear magnetic resonance controlled oscillator and rotational information is derived from the phases of the nuclear moment Larmor precession signals by phase comparison and magnetic field control circuits.

These devices have significant problems which limit their use. For instance, certain devices are limited by the relatively short relaxation times of the gases which they use. Also, typical strong direct coupling between the gases and the light which is used for magnetic moment alignment or magnetic moment detection limits both the relaxation times and the signal-to-noise ratio, and therefore limits usefulness of such instruments.

In U.S. Pat. No. 4,157,495 a nuclear magnetic resonance (hereinafter referred to as "NMR") angular rate sensor or gyroscope is disclosed that operates by sensing inertial angular rotation rate or angular displacement about a sensitive axis of the device as a shift in the Larmor precession frequency or phase, respectively, of one or more isotopes that possess nuclear magnetic moments. The gyroscope has an angular rotation sensor and its associated electronics. The principal elements of the sensor are a light source, an NMR cell, a photodetector, a set of magnetic shields and a set of magnetic field coils. The principal elements of the electronics are signal processing circuits to extract the Larmor precession frequency and phase information and circuits to generate and control magnetic fields, both steady and varying sinusoidally with time, that are used for operating the device.

The NMR cell is mounted within a set of magnetic shields to attenuate external magnetic fields to acceptably low levels. Magnetic field coils are used to apply very uniform magnetic fields to the NMR cell. Both a steady field and an AC carrier field are applied along the sensitive axis of the device, and AC feedback fields are applied along one of the transverse axes. The DC magnetic fields along both transverse axes are controlled to be substantially zero. The NMR cell contains an alkali metal vapor, such as rubidium or potassium, together with two isotopes of one or more noble gases, such as krypton-83, xenon-129, or xenon 131. A buffer gas such as helium may also be contained in the cell.

The NMR cell is illuminated by a beam of circularly polarized light, from a source such as a rubidium or potassium lamp or a rubidium or potassium solid state laser, which passes through the cell at an angle with respect to the steady magnetic field. Absorption of some of this light causes the atomic magnetic moments of the rubidium or potassium atoms to be partly aligned in the direction of the steady magnetic field. This alignment is partly transferred to the nuclear magnetic moments of the noble gases, and these moments are caused to precess about the direction of the steady magnetic field, which in turn creates magnetic fields that rotate at the respective Larmor precession frequencies of the two noble gases. The rotating fields modulate the precessional motions of the rubidium or potassium magnetic moments, which produces corresponding modulations of the transmitted light, to make it possible optically to detect the Larmor precession frequencies of the two noble gases.

The modulations of the light intensity are converted into electrical signals by a photodetector, and these signals are then electronically demodulated and filtered to create signals at the Larmor precession frequencies of the two noble gases. The difference between the two precession frequencies is used accurately to control the steady magnetic field so that it is constant. One of the noble gas precession frequencies is compared to a precision reference frequency, and the resulting difference frequency is a measure of the angular rotation rate of the gyroscope.

The two detected noble gas precession signals are also used to generate two AC feedback magnetic fields at the Larmor precession frequencies of the noble gases, and these are responsible for sustaining the precession of the nuclear magnetic moments of the noble gases. The use of an AC carrier magnetic field facilitates the optical detection of the precessing noble gas moments, and it is used to control the DC magnetic fields along the two transverse axes of the gyroscope.

According to the patent, the NMR gyroscope includes means for the simultaneous alignment of the nuclear magnetic moments of at least two nuclear moment gases which constitutes a nuclear magnetic moment alignment device; means for achieving sustained precession of these moments which constitutes a nuclear magnetic resonance oscillator capable of sustained oscillations; means for the optical detection of these precessing nuclear moments which constitutes a nuclear magnetic resonance detection device; means for accurately controlling the internal magnetic field of the device; and means for the accurate measurement of the frequency or phase of the detected nuclear moment precession signal of at least one of the nuclear moment gases to provide a measurement of the angular rotation rate or angular displacement, respectively, of the device with respect to inertial space.

More particularly, a steady magnetic field is applied to an NMR cell which is substantially shielded from other steady magnetic fields. The NMR cell contains a gas or vapor of a substance that possesses a magnetic moment that can be aligned by optical pumping, together with one or more additional gases, each of which possesses a nuclear magnetic moment. The NMR cell is illuminated by optical pumping light which has a directional component which is parallel to the direction of the steady magnetic field and which has the proper wavelength to be absorbed by the optically pumpable substance to align the magnetic moments of that substance. The nuclear moments of the nuclear moment gases are aligned and precess at their respective Larmor precession frequencies about the direction of the steady magnetic field. An AC magnetic field at a suitable carrier frequency is also applied to the NMR cell, and the cell is illuminated by detection light which has a directional component that is orthogonal to the direction of the AC carrier magnetic field and which has a wavelength that is essentially the same as that of the optical pumping light. The intensity of the part of the detection light that is transmitted by the cell is modulated in response to the total magnetic fields present in the cell including the magnetic fields that are generated by the precessing nuclear magnetic moments. The modulations of the transmitted light intensity are detected by a photodetector, and the detected signals are electronically demodulated to obtain signals at the Larmor precession frequencies of the nuclear moment gases.

In one embodiment of the patented invention, the alignment of the nuclear magnetic moments of each nuclear moment gas is accomplished by collisional interactions between the atoms of the optically pumpable substance and the atoms of the nuclear moment gas or gases. Sustained precession of the nuclear magnetic moments of each nuclear moment gas is produced by an AC feedback magnetic field at the Larmor precession frequency of the nuclear moment gas oriented a direction that is orthogonal to the direction of the steady magnetic field. The AC carrier magnetic field has a frequency at substantially the Larmor precession frequency of the optically pumpable substance, and it is directed substantially parallel to the direction of the steady magnetic field to permit the device to be operated at higher values of steady magnetic field strength and at correspondingly higher Larmor precession frequencies for the nuclear moment gases.

In the preferred embodiment of the patent, an optically pumpable substance such as a single alkali metal vapor is placed in an NMR cell together with two noble gases, and the nuclear magnetic moments of both noble gases are aligned simultaneously by collisional interactions between the atoms of the alkali metal atoms and the atoms of the two noble gases. The alkali metal is rubidium or potassium, and the noble gases are xenon-129, and xenon 131.

Another feature of the patent involves the use of at least one buffer gas in substantial quantities in the NMR cell.

In still another feature of the patent, the magnitude of the steady magnetic field remains constant because of feedback control of the field to cause the difference between the Larmor precession frequencies of the two noble gases in the NMR cell to be equal to a predetermined constant value.

It is yet another feature of the patent that one of the Larmor precession frequencies is compared to a precision reference frequency, and the resulting difference frequency is used as a measure of angular displacement or angular rate of the device about the direction of the steady magnetic field.

SUMMARY OF THE INVENTION

It is contemplated by this invention to include two, rather than one, alkali metal vapors within the NMR envelope. One of the vapors, for example rubidium or potassium, is used because it is easily excited or pumped by light from a rubidium or potassium lamp or a laser at the rubidium or potassium wavelength. The other alkali metal vapor, for example cesium or potassium, is easily pumped by a cesium or potassium lamp or laser at the cesium or potassium wavelength. The cesium or potassium within the NMR enclosure is modulated at the Larmor precession frequencies of the two nuclear magnetic moment gases such as xenon 129 and xenon 131. The cesium or potassium vapor is illuminated, for example, by a cesium or potassium lamp or laser, and the transmitted cesium or potassium radiation is modulated at the Larmor precession frequencies of the two nuclear moment gases. The transmitted light is detected, and the detected signals are used in a manner identical to that described in U.S. Pat. No. 4,157,495.

It is therefore an object of this invention to provide an NMR gyroscope using one pumpable vapor and a different sensing vapor. The words "different vapor" are defined herein to include different isotopes of the same vapor, particularly where the vapor is an alkali metal vapor.

It is a more specific object of this invention to use two alkaline vapors in an NMR gyro.

It is still a more specific object of this invention to use two different vapors chosen from the class consisting of rubidium, potassium or cesium vapors, one vapor as a pumping vapor and a different vapor as a detection vapor in an NMR gyro which uses two aligned nuclear moment gases precessing at their Larmor precession frequencies.

DESCRIPTION OF THE DRAWINGS

The only FIGURE is a conceptual diagram illustrating the optical pumping and modulating the itensity of the light transmitted by the NMR cell.

DETAILED DESCRIPTION OF THE PREFERRED EMBODIMENT

The FIGURE is a conceptual diagram illustrating for each of the noble gases the process of optical pumping and modulating of the intensity of the light that is transmitted through the NMR cell 28. Because these processes are similar for the two noble gases, they are illustrated and described for only one of the two noble gases. The circularly polarized pumping light, for example from a laser at the wavelength of a first alkali metal vapor, which enters the NMR cell 28 has a component 64 along the z-axis. Through the interactions of the optical pumping light 64 and the steady magnetic field 68, the alkali vapor atoms 60 have their magnetic moments aligned preferentially in the z-direction. By interatomic collisions this magnetic moment alignment is transferred from the alkali vapor atoms 60 to the noble gas nuclei 62 and to the atoms 61 of a second alkali vapor. The atoms 60 and 61 are of different materials preferably chosen from the class consisting of rubidium, potassium or cesium.

A sinusoidal AC feedback magnetic field 70 that is matched in frequency and phase to the Larmor precession frequency of the collective magnetic moment of the noble gas nuclei 62 is applied in the x-direction and serves to torque the magnetic moment of these nuclei to the X-y plane. This component of noble gas nuclear magnetic moment then precesses in the x-y plane at the noble gas Larmor precession frequency about the steady magnetic field 68. The precessing nuclear magnetic moment component creates a nuclear precession magnetic field that rotates in the x-y plane.

The detection light 66 at the wavelength of a second alkali metal vapor, for example from a lamp or a laser at the wavelength of the second alkali metal vapor, interacts with the second alkali metal atoms which are under the influence of the steady magnetic field 68, a superimposed AC carrier magnetic field 69, and the y-component of the nuclear precession field. The interaction causes the intensity of the x-component of the transmitted light 72 of the second alkali metal to be modulated at the carrier frequency with a modulation envelope 74 at the nuclear precession frequency. The light modulations are converted into electrical signals by the photodetector 40. As in U.S. Pat. No. 4,157,495, the electrical signals may be used by an electronic circuit to create signals which are measures of angular velocity of the gyro.

| PAT. NO. | INVENTOR | TITLE | ISSUED |
|---|---|---|---|
| | RELATED PATENTS | | |
| 4,157,495 | B. C. Grover, et al. | Nuclear Magnetic Resonance Gyro | 6/5/79 |
| 3,103,623 | I. A. Greenwood, Jr. | Nuclear Gyroscope | 9/10/63 |
| 3,103,624 | I. A. Greenwood et al. | Nuclear Gyroscope | 9/10/63 |
| 3,396,329 | A. Salvi | Magnetic Resonance Magnetometers for Measuring Weak Magnetic Fields From Aboard a Moving Vehicle such as a Plane | 8/6/68 |
| 3,404,332 | A. Abragam et al. | Magnetic Resonance Devices for Accurately Measuring Magnetic Fields in Particular Low Magnetic Fields, on Board a Movable Body | |
| 3,500,176 | A. Kastler, et al. | Method and Apparatus for Controlling a Magnetic Field Employing Optically Pumped Nuclear Resonance | 3/10/70 |
| 3,513,381 | W. Happer, Jr. | Off-Resonant Light as Probe of Optically Pumped Alkali Vapors | 5/19/70 |
| 3,729,674 | J. R. Lowdenslager | Digital Nuclear Gyroscopic Instrumentation and Digital Phase Locked Loop Therefor | 4/24/73 |

In conclusion, the present invention has been described in terms of particular elements and particular physical arrangements, but it is clear that reasonable alternatives, such as the use of different optical paths accomplishing the same results, or the use of different combinations of the noble gases or the use of a different pumpable substance than rubidium, potassium or cesium, or the use of other values for the frequencies or magnetic fields mentioned in the foregoing specification, may all be within the scope of the present invention.

What is claimed is:

1. In a nuclear magnetic resonance detection device including a nuclear magnetic resonance cell, a gas vapor of a first optically pumpable substance that possesses a magnetic moment and is capable of being optically pumped, said pumpable substance being contained in said cell, at least one nuclear moment gas each having a nuclear magnetic moment also contained in said cell, the nuclear magnetic moments of each said nuclear moment gas being at least partly aligned, means for applying a steady magnetic field to said cell, first means for illuminating said cell with pumping light capable of partly aligning the magnetic moments of said optically pumpable substance in one direction by absorption of said light, means for precessing said aligned nuclear magnetic moments of each said nuclear moment gas about the direction of the steady magnetic field at the respective Larmor precession frequencies of each said nuclear moment gas, means for applying an AC carrier magnetic field to said cell, the improvement comprising:

a gas vapor of a second optically pumpable substance that possess a magnetic moment and is capable of being optically pumped, said second optically pumpable substance being contained in said cell;

second means for illuminating said cell with detection light of a wavelength approximately equal to a wavelength which can be absorbed by said second optically pumpable substance;

means for applying said detection light with a component orthogonal to the direction of said AC carrier magnetic field to produce modulations in the intensity of the transmitted part of said detection light substantially at the frequency of at least one harmonic, including the fundamental of said AC carrier magnetic field; and means for detecting at least one of said modulations in the intensity of the transmitted part of said detection light.

2. Apparatus as recited in claim 1 in which said two optically pumpable substances are different alkali metal vapors.

3. Apparatus as recited in claim 2 in which said first and second optically pumpable substances are two different alkali metal vapors chosen from the class consisting of rubidium vapor, potassium vapor, or cesium vapor.

4. Apparatus as recited in claim 3 in which said first means for illuminating is a laser at the wavelength of a first said alkali metal vapor, and said second means for illuminating is a laser at the wavelength of a second said alkali metal vapor.

5. Apparatus as recited in claims 3 or 4 in which said first alkali metal vapor is rubidium and said second alkali metal vapor is cesium.

6. Apparatus as recited in claims 3 or 4 in which said first alkali metal vapor is potassium and said second alkali metal vapor is cesium.

* * * * *